(12) United States Patent
Page (10) Patent No.: US 11,439,263 B1
(45) Date of Patent: Sep. 13, 2022

(54) HOLOGRAPHIC CHRISTMAS TREE

(71) Applicant: Denise Page, Ocala, FL (US)

(72) Inventor: Denise Page, Ocala, FL (US)

( * ) Notice: Subject to any disclaimer, the term of this patent is extended or adjusted under 35 U.S.C. 154(b) by 239 days.

(21) Appl. No.: 16/877,604

(22) Filed: May 19, 2020

(51) Int. Cl.
| | |
|---|---|
| *G03H 1/00* | (2006.01) |
| *A47G 33/06* | (2006.01) |
| *G03H 1/22* | (2006.01) |
| *A47G 33/12* | (2006.01) |
| *A47G 33/08* | (2006.01) |
| *G03H 1/04* | (2006.01) |
| *G03H 1/02* | (2006.01) |
| *G02F 1/29* | (2006.01) |
| *G03H 1/08* | (2006.01) |
| *G03H 1/26* | (2006.01) |

(52) U.S. Cl.
CPC ............. *A47G 33/06* (2013.01); *A47G 33/08* (2013.01); *A47G 33/12* (2013.01); *G03H 1/04* (2013.01); *G03H 1/22* (2013.01); *A47G 2033/122* (2013.01); *G02F 1/29* (2013.01); *G03H 1/024* (2013.01); *G03H 1/0272* (2013.01); *G03H 1/0891* (2013.01); *G03H 1/26* (2013.01); *G03H 2001/0038* (2013.01); *G03H 2001/0055* (2013.01); *G03H 2001/0228* (2013.01); *G03H 2001/0441* (2013.01); *G03H 2210/30* (2013.01)

(58) Field of Classification Search
CPC ........ A47G 33/06; A47G 33/08; A47G 33/12; A47G 2033/122; G03H 1/04; G03H 1/22; G03H 1/024; G03H 1/0272; G03H 1/0891; G03H 1/26; G03H 2001/0038; G03H 2001/0055; G03H 2001/0228; G03H 1/0005; G03H 2001/0441; G03H 2210/30; G02F 1/29
USPC .......................................................... 359/1
See application file for complete search history.

(56) References Cited

U.S. PATENT DOCUMENTS

| | | |
|---|---|---|
| 4,057,317 A | 11/1977 | Upatnieks |
| 4,878,157 A | 10/1989 | Koch |
| 5,104,608 A | 4/1992 | Pickering |
| 5,260,814 A | 11/1993 | Smith |
| 5,517,390 A | 5/1996 | Zins |
| D415,713 S | 10/1999 | Kao |
| 7,040,795 B2 | 5/2006 | Puleo, Sr. |
| 8,890,932 B2 | 11/2014 | Fan |
| 10,327,576 B2 | 6/2019 | Gallaga |
| 2020/0251016 A1* | 8/2020 | Vuong .................... A63H 33/28 |
| 2021/0203893 A1* | 7/2021 | Yanez .................... H04R 1/028 |

FOREIGN PATENT DOCUMENTS

| | | | | |
|---|---|---|---|---|
| CN | 207181987 U | * | 4/2018 | |
| GB | 2578523 A | * | 5/2020 | ......... G02B 27/0103 |

* cited by examiner

Primary Examiner — Stephone B Allen
Assistant Examiner — Jyotsna V Dabbi
(74) Attorney, Agent, or Firm — Kyle A. Fletcher, Esq.

(57) ABSTRACT

The holographic Christmas tree is a holographic device. The holographic Christmas tree projects a three-dimensional image of a Christmas tree. The holographic Christmas tree includes a pedestal, a holographic projector, a substrate, and an image. The image is the three-dimensional image of a Christmas tree. The holographic substrate projects the image into the substrate. The pedestal contains the holographic projector.

16 Claims, 5 Drawing Sheets

HOLOGRAPHIC CHRISTMAS TREE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and holography, more specifically, a holographic apparatus. (G03H1/22)

SUMMARY OF INVENTION

The holographic Christmas tree is a holographic device. The holographic Christmas tree projects a three-dimensional image of a Christmas tree. The holographic Christmas tree comprises a pedestal, a holographic projector, a substrate, and an image. The image is the three-dimensional image of a Christmas tree. The holographic substrate projects the image into the substrate. The pedestal contains the holographic projector.

These together with additional objects, features and advantages of the holographic Christmas tree will be readily apparent to those of ordinary skill in the art upon reading the following detailed description of the presently preferred, but nonetheless illustrative, embodiments when taken in conjunction with the accompanying drawings.

In this respect, before explaining the current embodiments of the holographic Christmas tree in detail, it is to be understood that the holographic Christmas tree is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the holographic Christmas tree.

It is therefore important that the claims be regarded as including such equivalent construction insofar as they do not depart from the spirit and scope of the holographic Christmas tree. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
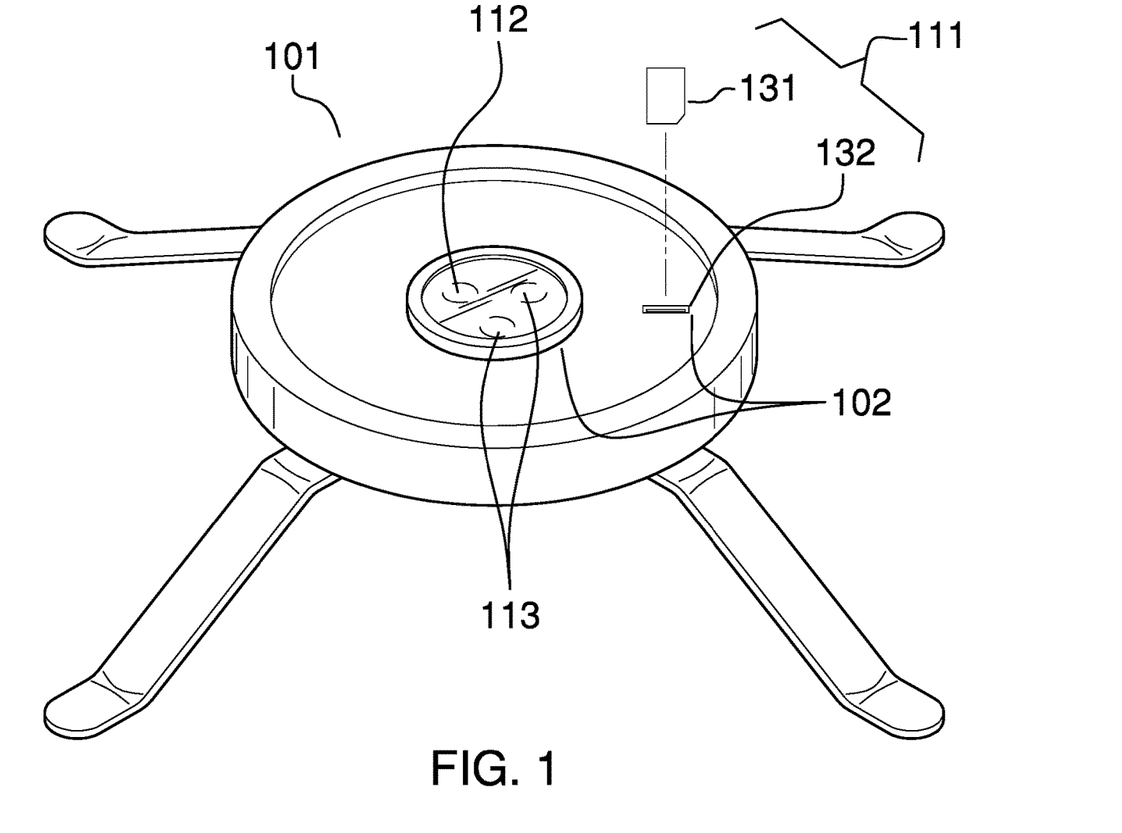
FIG. 1 is a perspective view of an embodiment of the disclosure.
Figure 2:
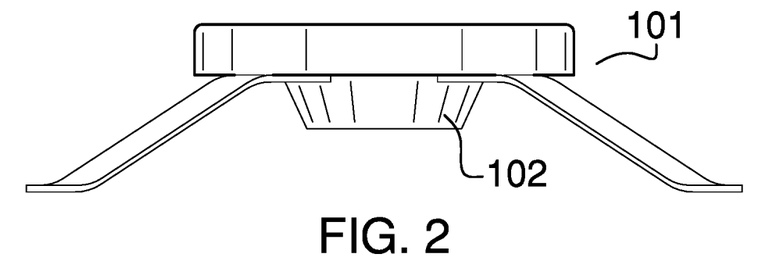
FIG. 2 is a front view of an embodiment of the disclosure.
Figure 3:
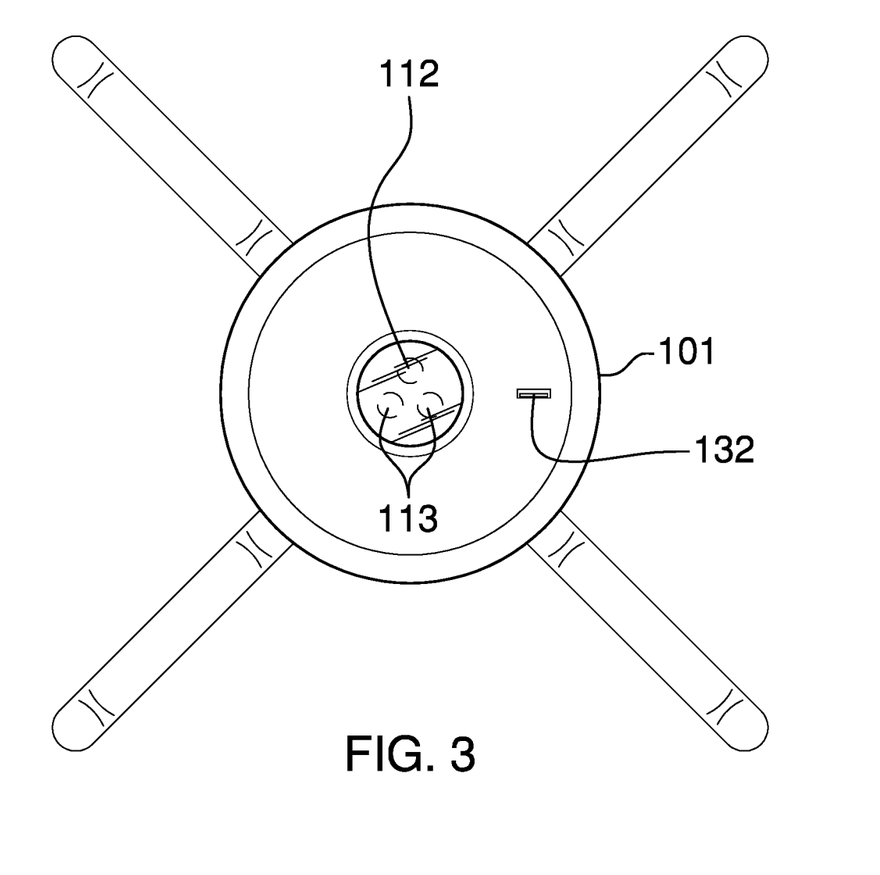
FIG. 3 is a side view of an embodiment of the disclosure.
Figure 4:
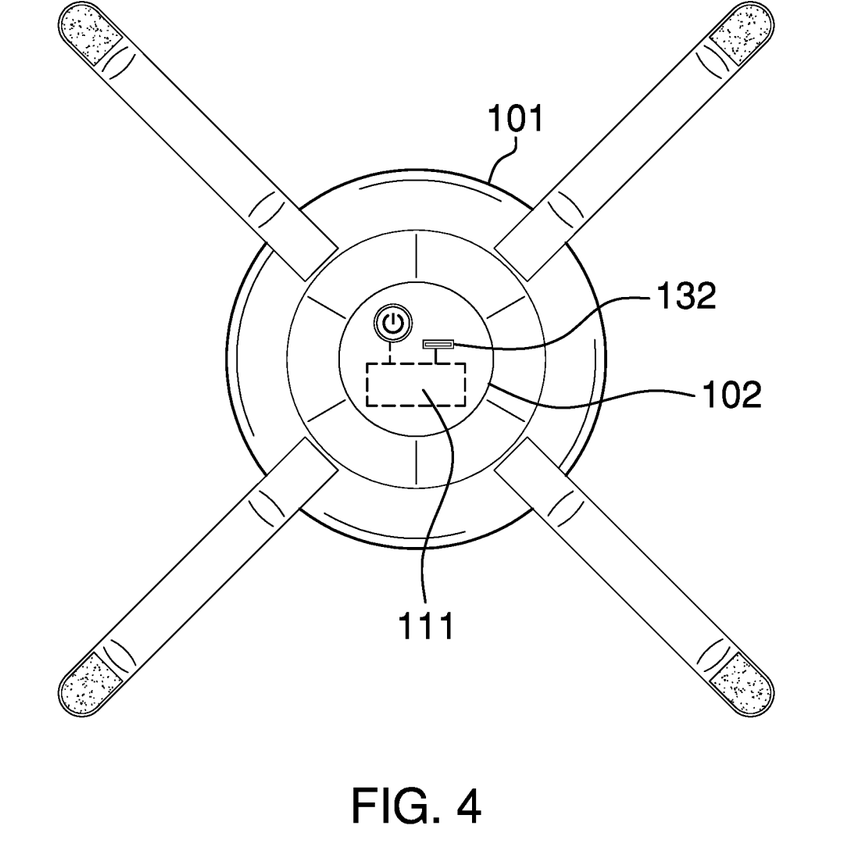
FIG. 4 is a bottom view of an embodiment of the disclosure.
Figure 5:
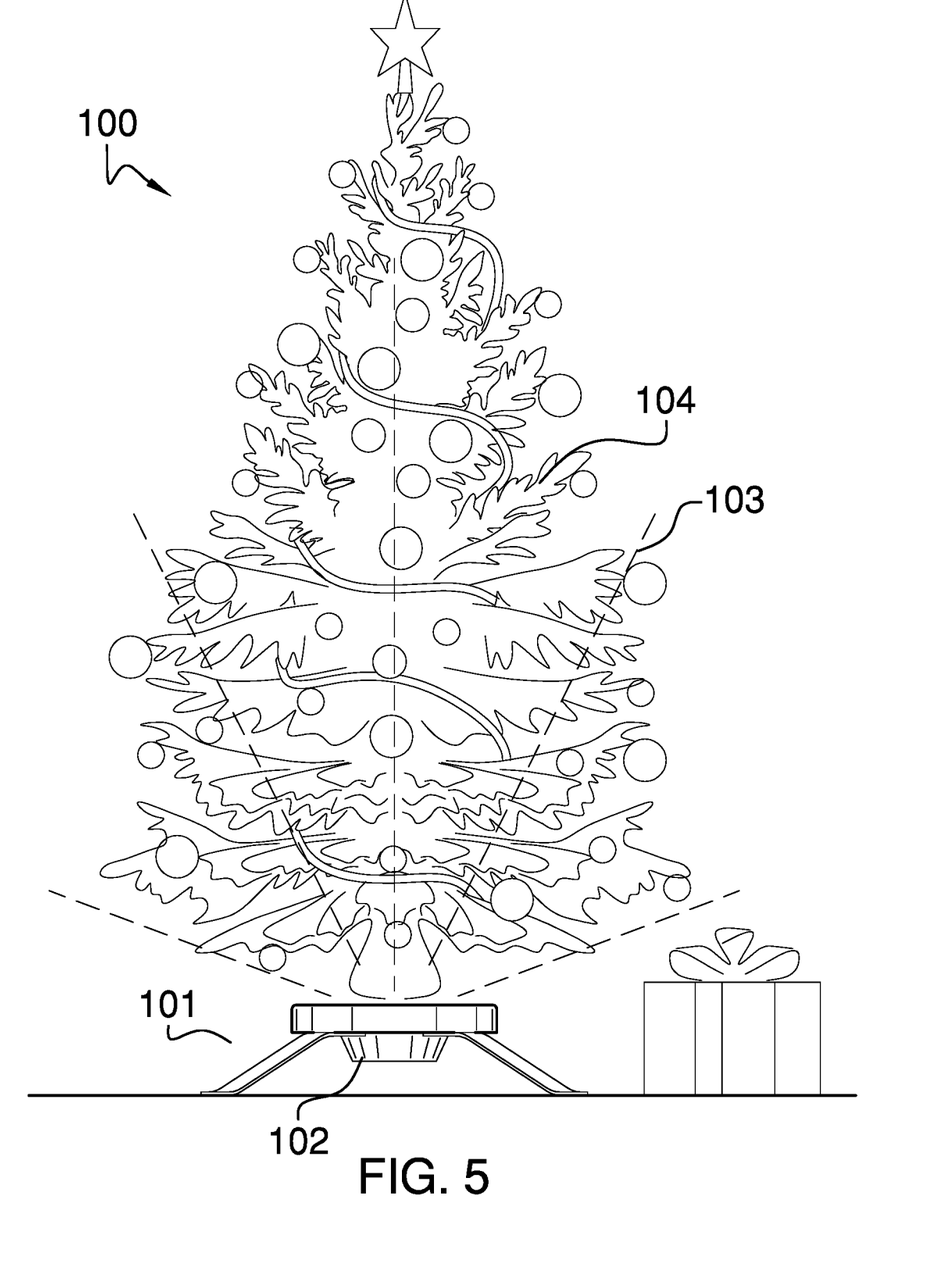
FIG. 5 is an in-use view of an embodiment of the disclosure.
Figure 6:
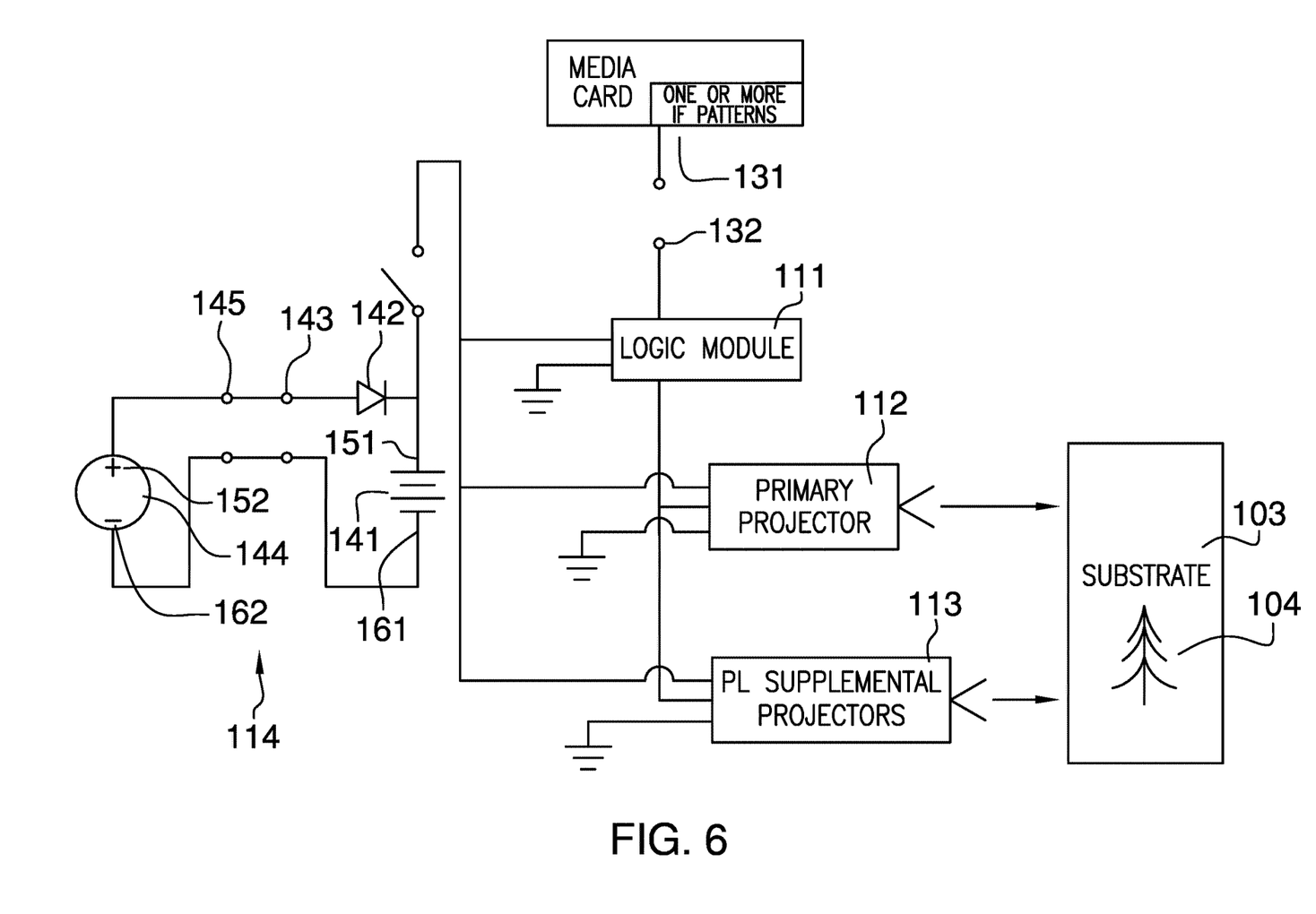
FIG. 6 is a schematic view of an embodiment of the disclosure.

Detailed reference will now be made to one or more potential embodiments of the disclosure, which are illustrated in FIGS. 1 through 6.

The holographic Christmas tree 100 (hereinafter invention) is a holographic device. The invention 100 projects a three-dimensional image 104 of a Christmas tree. The invention 100 comprises a pedestal 101, a holographic projector 102, a substrate 103, and an image 104. The image 104 is the three-dimensional image 104 of a Christmas tree. The holographic projector 102 projects the image 104 into the substrate 103. The pedestal 101 contains the holographic projector 102.

The image 104 is a holographic image 104. The image 104 is a three-dimensional representation of a Christmas tree.

The pedestal 101 forms a load path that transfers the load of the holographic projector 102, and when appropriate, the substrate 103 to the supporting surface. The pedestal 101 is a rigid casing. The pedestal 101 contains the holographic projector 102. The pedestal 101 is formed with all apertures and form factors necessary to allow the pedestal 101 to accommodate the use and operation of the holographic projector 102. Methods to form a pedestal 101 suitable for the purposes described in this disclosure are well-known and documented in the mechanical arts. In the first potential embodiment, the pedestal 101 is formed with the appearance of a Christmas tree stand.

The substrate 103 is a mechanical structure configured to scatter monochromatic electromagnetic radiation. The holographic projector 102 transmits the monochromatic electromagnetic radiation into and through the substrate 103 such that the substrate 103 scatters the monochromatic electromagnetic radiation. The scattering of the monochromatic electromagnetic radiation by the substrate 103 makes the holographic image 104 formed by the monochromatic electromagnetic radiation generated by the holographic projector 102 visible to an observer. The substrate 103 is defined elsewhere in this disclosure. In the first potential embodiment of the disclosure, the applicant assumes that the substrate 103 is formed from condensed water vapor formed by passing atmospheric gases over dry ice.

The holographic projector 102 is an electric circuit. The holographic projector 102 generates and projects a holographic image 104 into the substrate 103. The holographic image 104 projected by the holographic projector 102 is interchangeable. By interchangeable is meant that a first holographic image 104 projected by the holographic projector 102 can be exchanged with a second holographic image 104. The holographic projector 102 is configured to project a primary holographic image 104 and one or more supplemental holographic images 104 which can be overlaid to generate the final holographic image 104. The holographic projector 102 is an independently powered electric circuit. By independently powered is meant that the holographic projector 102 can operate without an electrical connection to an external power source 144.

The holographic projector 102 comprises a logic module 111, a primary projector 112, a one or more supplemental projectors 113, and a power system 114. The logic module 111, the primary projector 112, the one or more supplemental projectors 113, and the power system 114 are electrically interconnected.

The logic module 111 is an electric circuit. The logic module 111 is a programmable device. The logic module 111 receives one or more interference patterns. The logic module 111 transmits an interference pattern selected from the one or more interference patterns to a projector selected from the group consisting of: a) the primary projector 112; and, b) a projector selected from the one or more supplemental projectors 113. The selected projector converts the selected interference pattern received from the logic module 111 into a holographic image 104. The logic module 111 further comprises a media card 131 and a media card 131 port 132. The media card 131 port 132 forms an electric connection between the media card 131 and the logic module 111.

The media card 131 contains a digital representation of a plurality of interference patterns transmitted by the logic module 111 to each projector selected from the group consisting of the primary projector 112 and the one or more supplemental projectors 113. The media card 131 is a memory device. The memory device is defined elsewhere in this disclosure. The media card 131 is configured to contain still holographic images 104 as well as video holographic images 104.

The media card 131 port 132 forms an electric connection between the media card 131 and the logic module 111. The media card 131 port 132 forms an interface that allows the logic module 111 to access the plurality of interference patterns from the media card 131.

The primary projector 112 is an electric device that projects a holographic image 104. The primary projector 112 generates an initial holographic image 104 selected from the group consisting of: a) the final holographic image 104; and b) a portion of the final holographic image 104. The primary projector 112 uses the interference pattern received from the logic module 111 to generate the initial holographic image 104. The primary projector 112 uses a first monochromatic electromagnetic radiation to generate the initial holographic image 104.

The primary projector 112 projects a base holographic image 104 of a Christmas tree. The Christmas tree used to form the holographic image 104 is selected from the group consisting of a Balsam Fir, a Frasier Fir, a Canaan Fir, a Douglas Fir, a Grand Fir, a Noble Fir, a Concolor Fir, a White Pine, a Scotch Pine, a Virginia Pine, a Blue Spruce, a Norway Spruce, a White Spruce, an Arizona Cypress, a Leyland Cypress, and a Red Cedar.

Each of the one or more supplemental projectors 113 is an electric device that projects a holographic image 104. Each of the one or more supplemental projectors 113 generates a supplemental holographic image 104 that forms a portion of the final holographic image 104. Each of the one or more supplemental projectors 113 uses the interference pattern received from the logic module 111 to generate the supplemental holographic image 104. Each of the one or more supplemental projectors 113 uses a subsequent monochromatic electromagnetic radiation to generate the supplemental holographic image 104.

Each of the one or more supplemental projectors 113 projects an overlay holographic image 104 of the decorations on the Christmas tree. Specifically, the supplemental holographic image 104 generated by each of the one or more supplemental projectors 113 overlays the initial holographic image 104 generated by the primary projector 112. By overlay is meant that the final holographic image 104 generated by the primary projector 112 and the one or more supplemental projectors 113 shows the decorations generated by the one or more supplemental projectors 113 as being positioned on the Christmas tree generated by the primary projector 112.

The wavelength of the monochromatic electromagnetic radiation used by any initial supplemental projector selected from the one or more supplemental projectors 113 is different from the wavelength of the monochromatic electromagnetic radiation used by any subsequent supplemental projector selected from the one or more supplemental projectors 113. The wavelength of the first monochromatic electromagnetic radiation used by the primary projector 112 is different from the wavelength of the monochromatic electromagnetic radiation used by any supplemental projector selected from the one or more supplemental projectors 113. The use of multiple projectors using different wavelengths for their monochromatic electromagnetic radiation allows for multiple colors to be displayed on the final holographic image 104 generated by the invention 100.

The power system 114 is an electrical circuit. The power system 114 powers the operation of the holographic projector 102. The power system 114 is an electrochemical device. The power system 114 converts chemical potential energy into the electrical energy required to power the holographic projector 102. The power system 114 comprises a battery 141, a diode 142, a charging port 143, and an external power source 144. The external power source 144 further comprises a charging plug 145. The battery 141, the diode 142, the charging port 143, the external power source 144, and the charging plug 145 are electrically interconnected. The battery 141 is further defined with a first positive terminal 151 and a first negative terminal 161. The external power source 144 is further defined with a second positive terminal 152 and a second negative terminal 162.

The battery 141 is an electrochemical device. The battery 141 converts chemical potential energy into the electrical energy used to power the holographic projector 102. The battery 141 is a commercially available rechargeable battery 141. The chemical energy stored within the rechargeable battery 141 is renewed and restored through the use of the charging port 143. The charging port 143 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable battery 141 to generate electricity.

The charging port 143 forms an electrical connection to an external power source 144 using a charging plug 145. The charging plug 145 forms a detachable electrical connection with the charging port 143. The charging port 143 receives electrical energy from the external power source 144 through the charging plug 145. The diode 142 is an electrical device that allows current to flow in only one direction. The diode 142 installs between the rechargeable battery 141 and the charging port 143 such that electricity will not flow from the first positive terminal 151 of the rechargeable battery 141 into the second positive terminal 152 of the external power source 144. In the first potential embodiment of the disclosure, the external power source 144, the charging plug 145, and the charging port 143 are compatible with USB power requirements.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Carbon Dioxide: As used in this disclosure, carbon dioxide (CAS 124-38-9) refers to a chemical compound with the formula $CO_2$. In the solid phase, carbon dioxide is often referred to as dry ice.

Control Circuit: As used in this disclosure, a control circuit is an electrical circuit that manages and regulates the behavior or operation of a device.

Crystal: As used in this disclosure, a crystal refers to a three-dimensional solid material whose molecules are arranged in a regular (or repeating) geometric structure. A crystal will often have a symmetric structure.

Diode: As used in this disclosure, a diode is a two terminal semiconductor device that allows current flow in only one direction. The two terminals are called the anode and the cathode. Electric current is allowed to pass from the anode to the cathode.

Electromagnetic Radiation: As used in this disclosure, electromagnetic radiation refers to an interaction between electric fields and magnetic fields that is capable of transmitting energy through a vacuum.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Hologram: As used in this disclosure, a hologram is a three-dimensional image. The hologram is formed using a source of monochromatic electromagnetic radiation, such as a laser, an interference pattern, and a substrate. The interference pattern is captured as an image. The captured image is created by illuminating the subject of the image using the monochromatic electromagnetic radiation. When the monochromatic electromagnetic radiation is passed through the interference pattern into or onto the substrate, a three-dimensional image of the originally illuminated subject appears. The substrate is a tinted structure that is selected to scatter the monochromatic electromagnetic radiation such that the three-dimensional image can be seen. Examples of suitable substrates include, but are not limited to: a) water vapor generated by a steam generator or dry ice; b) a transparent structure that tinted with reflective particles either as a coating or embedded within the structure, and, c) a transparent crystal structure. The described transparent structure is often referred to as "fog glass." Suitable transparent structures include, but are not limited to: a) glass; b) acrylic (poly(methyl methacrylic) (CAS 9011-14-7)), and, c) polycarbonate ((Poly[oxycarbonyloxy-1,4-phenylene(1-methylethylidene)-1,4-phenylene] (CAS 24936-68-3))).

Housing: As used in this disclosure, a housing is a rigid structure that encloses and protects one or more devices.

Image: As used in this disclosure, an image is an optical representation or reproduction of an indicia or of the appearance of something or someone.

Laser: As used in this disclosure, a laser is an electrical device used to generate monochromatic electromagnetic radiation. By monochromatic is meant that the generated photons forming the electromagnetic radiation all have the same wavelength.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Overlay: As used in this disclosure, an overlay refers to the placement of a second image over a first image such that: a) a portion of the first image is visible through the second image; and, b) the second image supplements the information presented in the first image.

Pedestal: As used in this disclosure, a pedestal is an intermediary load bearing structure that that forms a load path between a supporting surface and an object, structure, or load.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Projector: As used in this disclosure, a projector is a device that uses light and a lens system to project an image on a surface.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Tinted: As used in this disclosure, a tinted object is a first object made of first transparent material that has been coated, treated, or processed with a second material that reduces the amount of light that passes through the transparent material of the first object while not significantly scattering the light that passes through the first transparent material such that object behind the first object would remain clearly visible.

Transparent: As used in this disclosure, transparent refers to a material that allows light to pass through the material without significant scattering such that an object can be clearly seen through the material.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A holographic Christmas tree comprising
a pedestal, a holographic projector, a substrate, and an image;
wherein the holographic Christmas tree is a holographic device;
wherein the holographic projector projects the image into the substrate;
wherein the pedestal contains the holographic projector;
wherein the image is a holographic image;
wherein the image is a three-dimensional representation of a Christmas tree;
wherein the holographic projector is an electric circuit;
wherein the holographic projector generates and projects a holographic image into the substrate;
wherein the holographic image projected by the holographic projector is interchangeable;
wherein by interchangeable is meant that a first holographic image projected by the holographic projector is replaceable with a second holographic image;
wherein the substrate scatters a monochromatic electromagnetic radiation;
wherein the holographic projector transmits the monochromatic electromagnetic radiation into and through the substrate such that the substrate scatters the monochromatic electromagnetic radiation;
wherein the holographic projector comprises a logic module, a primary projector, a one or more supplemental projectors, and a power system;
wherein the logic module, the primary projector, the one or more supplemental projectors, and the power system are electrically interconnected;
wherein the substrate is formed from condensed water vapor formed by passing atmospheric gases over dry ice.

2. The holographic Christmas tree according to claim 1 wherein the pedestal is a rigid casing;
wherein the pedestal forms a load path that transfers the load of the holographic projector and the substrate to a supporting surface.

3. The holographic Christmas tree according to claim 2 wherein the holographic projector is configured to project a primary holographic image and one or more supplemental holographic images which are overlaid to generate the final holographic image.

4. The holographic Christmas tree according to claim 3 wherein the holographic projector is an independently powered electric circuit;
wherein by independently powered is meant that the holographic projector can operate without an electrical connection to an external power source.

5. The holographic Christmas tree according to claim 4 wherein the power system is an electrical circuit;
wherein the power system powers the operation of the holographic projector;
wherein the power system is an electrochemical device;
wherein the power system converts chemical potential energy into the electrical energy required to power the holographic projector.

6. The holographic Christmas tree according to claim 5 wherein the power system comprises a battery, a diode, a charging port, and an external power source;
wherein the external power source further comprises a charging plug;
wherein the battery, the diode, the charging port, the external power source, and the charging plug are electrically interconnected;
wherein the battery is further defined with a first positive terminal and a first negative terminal;
wherein the external power source is further defined with a second positive terminal and a second negative terminal.

7. The holographic Christmas tree according to claim 6 wherein the logic module further comprises a media card and a media card port;
wherein the media card port forms an electric connection between the media card and the logic module.

8. The holographic Christmas tree according to claim 7 wherein the logic module is an electric circuit;
wherein the logic module is a programmable device;
wherein the logic module receives one or more interference patterns.

9. The holographic Christmas tree according to claim 8 wherein the logic module transmits an interference pattern selected from the one or more interference patterns to a projector selected from the group consisting of: a) the primary projector; and, b) a projector selected from the one or more supplemental projectors;
wherein the selected projector converts the selected interference pattern received from the logic module into a holographic image.

10. The holographic Christmas tree according to claim 9 wherein the media card contains a digital representation of a plurality of interference patterns transmitted by the logic module to each projector selected from the group consisting of the primary projector and the one or more supplemental projectors;
wherein the media card is a memory device;

wherein the media card port forms an electric connection between the media card and the logic module;
wherein the media card port forms an interface that allows the logic module to access the plurality of interference patterns from the media card.

11. The holographic Christmas tree according to claim 10 wherein the primary projector is an electric device;
wherein the primary projector projects a holographic image;
wherein the primary projector generates an initial holographic image selected from the group consisting of: a) the final holographic image; and b) a portion of the final holographic image;
wherein the primary projector uses the interference pattern received from the logic module to generate the initial holographic image;
wherein the primary projector uses a first monochromatic electromagnetic radiation to generate the initial holographic image;
wherein the primary projector projects a base holographic image of a Christmas tree.

12. The holographic Christmas tree according to claim 11 wherein each of the one or more supplemental projectors is an electric device;
wherein each of the one or more supplemental projectors projects a holographic image;
wherein each of the one or more supplemental projectors generates a supplemental holographic image that forms a portion of the final holographic image;
wherein each of the one or more supplemental projectors uses the interference pattern received from the logic module to generate the supplemental holographic image;
wherein each of the one or more supplemental projectors uses a subsequent monochromatic electromagnetic radiation to generate the supplemental holographic image.

13. The holographic Christmas tree according to claim 12 wherein each of the one or more supplemental projectors projects an overlay holographic image of the decorations on the Christmas tree;
wherein the supplemental holographic image generated by each of the one or more supplemental projectors overlays the initial holographic image generated by the primary projector;
wherein by overlay is meant that the final holographic image generated by the primary projector and the one or more supplemental projectors shows the decorations generated by the one or more supplemental projectors as being positioned on the Christmas tree generated by the primary projector.

14. The holographic Christmas tree according to claim 13 wherein the wavelength of the monochromatic electromagnetic radiation used by any initial supplemental projector selected from the one or more supplemental projectors is different from the wavelength of the monochromatic electromagnetic radiation used by any subsequent supplemental projector selected from the one or more supplemental projectors;
wherein the wavelength of the first monochromatic electromagnetic radiation used by the primary projector is different from the wavelength of the monochromatic electromagnetic radiation used by any supplemental projector selected from the one or more supplemental projectors.

15. The holographic Christmas tree according to claim 14 wherein the battery is a rechargeable battery;
wherein the chemical energy stored within the rechargeable battery is renewed and restored through the use of the charging port;
wherein the charging port is an electrical circuit that reverses the polarity of the rechargeable battery;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

16. The holographic Christmas tree according to claim 15 wherein the pedestal is formed with the appearance of a Christmas tree stand.

\* \* \* \* \*